US009093197B2

(12) United States Patent
Shimada et al.

(10) Patent No.: US 9,093,197 B2
(45) Date of Patent: *Jul. 28, 2015

(54) COMPOSITION FOR WIRE COATING MEMBER, INSULATED WIRE, AND WIRING HARNESS

(75) Inventors: Tatsuya Shimada, Yokkaichi (JP); Masashi Kimura, Yokkaichi (JP); Kousuke Shiraki, Yokkaichi (JP); Mamoru Kondou, Yokkaichi (JP); Masashi Sato, Yokkaichi (JP)

(73) Assignees: AUTONETWORKS TECHNOLOGIES, LTD., Mie (JP); AUMITOMO WIRING SYSTEMS, LTD., Mie (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/520,516

(22) PCT Filed: Feb. 15, 2011

(86) PCT No.: PCT/JP2011/053085
§ 371 (c)(1),
(2), (4) Date: Jul. 3, 2012

(87) PCT Pub. No.: WO2011/102324
PCT Pub. Date: Aug. 25, 2011

(65) Prior Publication Data
US 2012/0273268 A1 Nov. 1, 2012

(30) Foreign Application Priority Data
Feb. 18, 2010 (JP) ................. 2010-033817

(51) Int. Cl.
C09D 123/26 (2006.01)
H02G 3/04 (2006.01)
H01B 7/295 (2006.01)
H01B 3/30 (2006.01)
C08L 23/02 (2006.01)
C08L 23/06 (2006.01)
C08L 23/26 (2006.01)
H01B 3/44 (2006.01)
C08K 3/22 (2006.01)
C08K 5/00 (2006.01)
C08K 5/3445 (2006.01)
C08L 27/22 (2006.01)
C08L 43/04 (2006.01)

(52) U.S. Cl.
CPC ............... *H01B 7/295* (2013.01); *C08L 23/02* (2013.01); *C08L 23/06* (2013.01); *C08L 23/26* (2013.01); *H01B 3/441* (2013.01); *C08K 3/22* (2013.01); *C08K 5/0066* (2013.01); *C08K 5/3445* (2013.01); *C08L 27/22* (2013.01); *C08L 43/04* (2013.01); *C08L 2203/202* (2013.01); *C08L 2203/206* (2013.01); *C08L 2312/00* (2013.01); *C08L 2312/06* (2013.01)

(58) Field of Classification Search
CPC ......... C09D 123/26; H02G 3/03; H01B 7/295
USPC ................. 524/432, 291; 523/435; 174/72 A, 174/110 SR
See application file for complete search history.

(56) References Cited

U.S. PATENT DOCUMENTS

| | | | |
|---|---|---|---|
| 5,284,889 | A | 2/1994 | Pyun et al. |
| 6,852,921 | B1 | 2/2005 | Koike et al. |
| 8,378,009 | B2 | 2/2013 | Inagaki et al. |
| 2002/0001715 | A1 | 1/2002 | Redondo et al. |
| 2009/0114417 | A1 | 5/2009 | Nakayama et al. |
| 2009/0255707 | A1 | 10/2009 | Moriuchi et al. |
| 2010/0000787 | A1 | 1/2010 | Shimada et al. |
| 2010/0163272 | A1 | 7/2010 | Inagaki et al. |
| 2011/0056728 | A1 | 3/2011 | Shiraki et al. |
| 2012/0241190 | A1 | 9/2012 | Shimada et al. |
| 2012/0273268 | A1 | 11/2012 | Shimada et al. |
| 2013/0161064 | A1 | 6/2013 | Shimada et al. |

FOREIGN PATENT DOCUMENTS

| | | |
|---|---|---|
| CN | 101319065 A | 12/2008 |
| CN | 101558117 A | 10/2009 |

(Continued)

OTHER PUBLICATIONS

JP2006-131720A—machine translation.*
JP2009-051918A—machine translation.*
International Search Report issued in International Patent Application No. PCT/JP2011/053085 dated Apr. 19, 2011.
Office Action issued Sep. 12, 2013 in Chinese Patent Application No. 201180010115.3.
Oct. 18, 2011 International Search Report issued in International Application No. PCT/JP2011/070173 (with English-language translation).

(Continued)

*Primary Examiner* — Ling Choi
*Assistant Examiner* — Ronald Grinsted
(74) *Attorney, Agent, or Firm* — Oliff PLC

(57) ABSTRACT

A composition for a wire coating member having flame retardancy that is heat resistant and productive without using electron irradiation crosslinking, and an insulated wire and a wiring harness having the same. The insulated wire includes a wire coating member containing the composition for the wire coating member that contains water-crosslinkable polyolefin containing polyolefin that is modified by a silane coupling agent, unmodified polyolefin, modified polyolefin that is modified by a functional group, a bromine flame retardant, a cross-linking catalyst, a phenolic antioxidant, and either one of a zinc sulfide, and a zinc oxide and an imidazole compound. The insulated wire is prepared by extrusion-coating a conductor with the composition to form the wire coating member around the conductor, and the wire coating member is water-crosslinked.

17 Claims, No Drawings

(56) References Cited

FOREIGN PATENT DOCUMENTS

| | | |
|---|---|---|
| CN | 102762650 A | 10/2012 |
| DE | 11 2010 004 666 T5 | 1/2013 |
| JP | A-54-76646 | 6/1979 |
| JP | A-55-110139 | 8/1980 |
| JP | A-H02-158646 | 6/1990 |
| JP | A-04-189855 | 7/1992 |
| JP | A-07-138419 | 5/1995 |
| JP | A-07-196857 | 8/1995 |
| JP | A-09-092055 | 4/1997 |
| JP | A-2009-092055 | 4/1997 |
| JP | A-2000-212291 | 8/2000 |
| JP | A-2000-265091 | 9/2000 |
| JP | A-2000-290439 | 10/2000 |
| JP | A-2000-294039 | 10/2000 |
| JP | A-2002-201318 | 7/2002 |
| JP | A-2002-356591 | 12/2002 |
| JP | A-2003-193622 | 7/2003 |
| JP | A-2005-2245 | 1/2005 |
| JP | 2006131720 A * | 5/2006 |
| JP | A-2006-131720 | 5/2006 |
| JP | A-2007-207642 | 8/2007 |
| JP | A-2008-117691 | 5/2008 |
| JP | A-2008-210670 | 9/2008 |
| JP | A-2008-222800 | 9/2008 |
| JP | A-2008-303251 | 12/2008 |
| JP | A-2008-303307 | 12/2008 |
| JP | 2009051918 A * | 3/2009 |
| JP | A-2009-51918 | 3/2009 |
| JP | A-2010-108798 | 5/2010 |
| JP | A-2010-174157 | 8/2010 |
| WO | WO 2007/058349 A1 | 5/2007 |
| WO | WO 2008/146921 A1 | 12/2008 |
| WO | WO 2009/008537 A1 | 1/2009 |
| WO | WO 2011/102324 | 8/2011 |

OTHER PUBLICATIONS

Sep. 12, 2013 Office Action issued in U.S. Appl. No. 13/820,646.
Mar. 8, 2011 International Search Report issued in International Patent Application No. PCT/JP2010/070733 (with translation).
Apr. 3, 2013 Chinese Office Action issued in Application No. 201080054676.9 (with translation).
Sep. 11, 2013 Office Action issued in U.S. Appl. No. 13/509,931.
U.S. Appl. No. 13/820,646, filed Mar. 4, 2013 in the name of Shimada et al.
U.S. Appl. No. 13/509,931, filed May 15, 2012 in the name of Shimada et al.
Office Action dated Feb. 25, 2014 issued in U.S. Appl. No. 13/509,931.
Japanese Office Action dated Feb. 18, 2014 issued in Japanese Patent Application No. 2010-033817 (with translation).
Office Action dated Jan. 24, 2014 issued in German Patent Application No. 11 2010 004 666.2 (with translation).
Office Action dated Feb. 12, 2014 issued in U.S. Appl. No. 13/820,646.
Chinese Office Action dated Dec. 27, 2013 issued in Chinese Patent Application No. 201080054676.9 (with translation).
Chinese Office Action dated Dec. 26, 2013 issued in Chinese Patent Application No. 201180043689.0 (with translation).
Office Action issued in German Patent Application No. 11 2011 100 601.2 (with English-language translation) dated May 13, 2014.
Japanese Office Action dated Apr. 1, 2014 issued in Japanese Patent Application No. 2012-252847 (with English translation).

* cited by examiner

COMPOSITION FOR WIRE COATING MEMBER, INSULATED WIRE, AND WIRING HARNESS

TECHNICAL FIELD

The present invention relates to a composition for a wire coating member, an insulated wire, and a wiring harness, and more specifically relates to a composition for a wire coating member that is favorably used as a coating member for an insulated wire for automobile of which heat resistance is required, and that has excellent properties such as flame retardancy, mechanical strength, heat resistance and chemical resistance, an insulated wire using the same, and a wiring harness using the same.

BACKGROUND ART

These days, hybrid cars become widespread, so that high voltage resistance and high heat resistance are required of wires and connectors for automobile. Conventionally, crosslinked polyvinyl chloride (PVC) wires or crosslinked polyolefin wires are used at sites where high heat is generated such as wiring harnesses in automobiles. These wires are mostly crosslinked by electron irradiation; however, there arises a problem that the electron irradiation crosslinking requires expensive crosslinking devices and facilities to cause an increase in production cost. Thus, water-crosslinking receives attention, in which a crosslinkable resin (water-crosslinkable resin) that is obtained by modifying a polyolefin resin by a silane coupling agent is used, because the crosslinking can be performed by inexpensive facilities (see PTLs 1 and 2, for example).

For example, PTL 1 discloses a non-halogenous flame-retardant silane-crosslinked polyolefin composition that is prepared by heat-kneading, and crosslinking a silane graftmer (A component) and a catalyst master batch (B component), where the silane graftmer (A component) is prepared by kneading a compound and 100 parts by mass of magnesium hydroxide, the compound being prepared by graft-polymerizing a silane coupling agent onto a polyolefin elastomer by heat-kneading 100 parts by mass of polyolefin elastomer, 1 to 3 parts by mass of silane coupling agent and 0.025 to 0.063 parts by mass of cross-linking agent, and where the catalyst master batch (B component) is prepared by impregnating 100 parts by mass of polyolefin elastomer with 1.0 to 3.12 parts by mass of cross-linking agent and 7.14 to 31.3 parts by mass of a cross-linking catalyst.

In addition, PTL 2 discloses, as a composition for a wire coating member, a resin composition for use by mixing with silane-crosslinkable polyolefin, the resin composition containing 100 parts by mass of at least one polymer that is selected from a group consisting of a thermoplastic resin, rubber and a thermoplastic elastomer 0.01 to 0.6 parts by mass of organic peroxide, 0.05 to 0.5 parts by mass of silanol condensation catalyst, and 100 to 300 parts by mass of magnesium hydroxide.

CITATION LIST

Patent Literature

PTL 1: Patent JP 2000-212291
PTL 2: Patent JP 2006-131720

SUMMARY OF INVENTION

Technical Problem

However, as cited in PTLs 1 to 2, a great amount of filler such as magnesium hydroxide that defines a flame retardant needs to be added to a water-crosslinkable resin in order to satisfy flame retardancy of a wire that is insulation coated with the water-crosslinkable resin. However, the addition of the great amount of filler promotes oxidation degradation of the water-crosslinkable resin, which causes a problem of degrading heat resistance that the material to be crosslinked inherently has.

In addition, because crosslinking develops by water in using a water-crosslinkable resin, water in the air promotes the crosslinking during heat molding, which can result in generation of an unintended substance. In order to prevent this problem, the number of times of heating processing needs to be minimized, so that generally a master batch containing a filler and a non-water-crosslinkable resin is prepared in advance, and then the master batch and the water-crosslinkable resin are mixed in a production process. However, the addition of the great amount of filler to the master batch increases viscosity of the master batch, which is liable to cause unfavorable dispersion or decrease in productivity.

The present invention is made in view of the problems described above, and an object of the present invention is to provide a composition for a wire coating member having flame retardancy that is excellent in heat resistance and productivity without using electron irradiation crosslinking, and to provide an insulated wire and a wiring harness having the same.

Solution to Problem

To achieve the objects and in accordance with the purpose of the present invention, a composition for a wire coating member of a preferred embodiment of the present invention contains (A) water-crosslinkable polyolefin that defines polyolefin that is modified by a silane coupling agent, (B) unmodified polyolefin, (C) modified polyolefin that is modified by a functional group, (D) a flame retardant, (E) a cross-linking catalyst, (F) a phenolic antioxidant, and (G) either one of (G1) a zinc sulfide, and (G2) a zinc oxide and (G3) an imidazole compound, wherein (D) the flame retardant contains (D1) a bromine flame retardant.

In another aspect of the present invention, an insulated wire of a preferred embodiment of the present invention includes a wire coating member that contains the composition for the wire coating member that is water-crosslinked.

Yet, in another aspect of the present invention, a wiring harness of a preferred embodiment of the present invention includes the insulated wire.

Advantageous Effects of Invention

Containing (A) the water-crosslinkable polyolefin that defines the polyolefin that is modified by the silane coupling agent, (B) the unmodified polyolefin, (C) the modified polyolefin that is modified by the functional group, (D) the flame retardant, (E) the cross-linking catalyst, (F) the phenolicantioxidant and (G) the either one of (G1) the zinc sulfide, and (G2) the zinc oxide and (G3) the imidazole compound, wherein (D) the flame retardant contains (D1) the bromine flame retardant, the composition for the wire coating member of the present embodiment of the present invention can be prepared using water-crosslinking that requires inexpensive facilities without using electron irradiation cross linking in producing a flame-retardant resin coat from the composition.

The produced coat does not need a great amount of filler such as magnesium hydroxide that defines a flame retardant to be added thereto, so that there is no possibility of degrading heat resistance that the material to be crosslinked inherently has, and thus the coat obtains excellent heat resistance.

In addition, because there is no need for adding a great amount of filler, when a master batch containing a filler and a non-water-crosslinkable resin is prepared in advance and then the master batch and the water-crosslinkable resin are mixed in forming a crosslinked resin coat such as a wire coating member by water-crosslinking the flame-retardant resin composition, the viscosity of the master batch does not increase. Thus, unfavorable dispersion or decrease in productivity can be prevented, so that the coat has favorable productivity.

Including the wire coating member that contains the composition for the wire coating member that is water-crosslinked, the insulated wire of the present embodiment of the present invention is excellent in heat resistance and a mechanical property. In addition, expensive electron irradiation crosslinking or synthesized magnesium hydroxide is not used in the insulated wire, the insulated wire can contribute to cost saving.

Including the insulated wire, the wiring harness of the present embodiment of the present invention is excellent in heat resistance and a mechanical property. In addition, expensive electron irradiation crosslinking or synthesized magnesium hydroxide is not used in the wiring harness, the wiring harness can contribute to cost saving.

DESCRIPTION OF EMBODIMENTS

A detailed description of preferred embodiments of the present invention will now be provided. A composition for a wire coating member of a preferred embodiment of the present invention contains the following materials, for example:

(A) water-crosslinkable polyolefin that defines polyolefin that is modified by a silane coupling agent, (B) unmodified polyolefin, (C) modified polyolefin that is modified by a functional group, (D): (D1) a bromine flame retardant, or (D1) a bromine flame retardant and (D2) antimony trioxide a flame retardant, that define a flame retardant, (E) a cross-linking catalyst, (F) a phenolic antioxidant, (G) either one of (G1) a zinc sulfide, and (G2) a zinc oxide and (G3) an imidazole compound, and (H) a copper inhibitor.

In particular, the composition of the present embodiment of the present invention is characterized in that (D1) the bromine flame retardant that defines the flame retardant is contained in the water-crosslinked resin composition mainly made of the polyolefin resin. It is expected that (D1) the bromine flame retardant effectively captures active radical at the time of polyolefin burning. The addition of (D1) the bromine flame retardant eliminates the necessity of adding a great amount of filler such as magnesium hydroxide, which is conventionally added, so that heat resistance of a coat that is made from the resin composition is improved, and problems of unfavorable dispersion and decrease in productivity in a production process can be solved. Hereinafter, descriptions of the materials are provided.

The resin composition for the wire coating member is mainly made of polyolefin resins, which contains at least (A) the water-crosslinkable polyolefin, (B) the unmodified polyolefin, and (C) the modified polyolefin that define a resin component. The resin component consisting of the (A), (B) and (C) components usually makes up 40% by mass or more, and more preferably 45% by mass or more of the composition.

Further, it is preferable that the ratio between the resin component consisting of the (A), (B) and (C) components, and (D1) the bromine flame retardant in the composition is set as follows because a harmonious balance can be maintained among heat resistance, a mechanical property and flame retardancy.

(A) the water-crosslinkable polyolefin: 30 to 90 parts by mass, preferably 40 to 80 parts by mass, and more preferably 50 to 70 parts by mass (B) the unmodified polyolefin +(C) the modified polyolefin: 70 to 10 parts by mass, preferably 60 to 20 parts by mass, and more preferably 50 to 30 parts by mass (D1) the bromine flame retardant: 10 to 70 parts by mass, preferably 10 to 50 parts by mass, and more preferably 10 to 30 parts by mass with respect to 100 parts by mass of the total content of the (A), (B) and (C) components (B) The unmodified polyolefin and (C) the modified polyolefin are added in order to improve the properties of the water-crosslinkable polyolefin. A crosslinked coat made from a water-crosslinkable polyolefin, a cross-linking catalyst, and a flame retardant has sufficient heat resistance. However, properties other than the heat-resistance are insufficient if the coat is used for wire coating. The addition of (B) the unmodified polyolefin and (C) the modified polyolefin can improve the other properties, and thereby a wire coat in which a harmonious balance is maintained among the properties can be obtained. In addition, (B) the unmodified polyolefin and (C) the modified polyolefin are kneaded, to which additives such as the flame retardant is added, and contained in a flame-retardant batch that does not include the water-crosslinkable polyolefin in preparing the composition (described in detail later).

A mixing ratio between (B) the unmodified polyolefin and (C) the modified polyolefin is preferably in the range of (B)/(C)=95/5 to 50/50 by mass ratio, and more preferably 90/10 to 70/30 by mass ratio. The mixing ratio within these ranges can contribute to cost-efficiency and can prevent excessive reaction by the functional group.

Examples of (A) the water-crosslinkable polyolefin includes silane-grafted Polyolefin. The silane-grafted polyolefin defines polyolefin that is prepared by grafting a silane coupling agent onto the polyolefin.

Examples of the polyolefin include polyethylene such as high density polyethylene (HDPE), middle density polyethylene (MDPE), low density polyethylene (LDPE), linear low density polyethylene (LLDPE) and very low density polyethylene (VLDP), polypropylene, a homopolymer of the other olefins, an ethylene copolymer such as an ethylene-alpha-olefin copolymer, an ethylene-vinyl acetate copolymer, an ethylene-acrylic ester copolymer and an ethylene-methacrylic ester copolymer, a propylene copolymer such as a propylene-alpha-olefin copolymer, a propylene-vinyl acetate copolymer, a propylene-acrylic ester copolymer and a propylene-methacrylic ester copolymer, and an olefin-based elastomer such as an ethylene elastomer (PE elastomer) and a propylene elastomer (PP elastomer). They may be used singly or in combination.

Among them, the polyethylene, the polypropylene, the ethylene-vinyl acetate copolymer, the ethylene-acrylic ester copolymer and the ethylene-methacrylic ester copolymer are preferably used.

In particular, the polyethylene, which has appropriate flexibility, is preferably used for the polyolefin used in (A) the water-crosslinkable polyolefin. To be specific, it is preferable to use a one or a plurality of polyethylene selected from the group consisting of the very low density polyethylene, the linear low density polyethylene, and the low density polyethylene. Using the polyethylene that is excellent in flexibility for a composition for a wire coating member allows the wire to be handled easily, and to be wired finely. Metal locene very low density polyethylene is preferably used for the polyolefin from the viewpoint of improving a tensile elongation property.

Examples of the silane coupling agent include vinylalkoxysilane such as vinyltrimethoxysilane, vinyltriethoxysilane and vinyltributoxysilane, normal hexyl trimethoxysilane, vinylacetoxysilane, gamma-methacryloxypropyltrimethoxysilane, and gamma-methacryloxypropylmethyldimethoxysilane. They may be used singly or in combination.

The content of the silane coupling agent is preferably in the range of 0.5 to 5 parts by mass, and more preferably in the range of 3 to 5 parts by mass with respect to 100 parts by mass of the polyolefin onto which the silane coupling agent is to be grafted. If the content is less than 0.5 parts by mass, the graft amount of the silane coupling agent is too small, which makes it difficult for the composition to obtain a sufficient crosslinking degree during silane crosslinking. On the other hand, if the content is more than 5 parts by mass, a crosslinking reaction proceeds excessively to generate a gel-like material. In such a case, asperities are liable to appear on a product surface, which decreases mass productivity of the product. In addition, melt viscosity of the composition becomes too high and an excessive load is applied on an extruder, which results in decreased workability.

A graft amount of the silane coupling agent (a mass ratio of the grafted silane coupling agent to the polyolefin before silane grafting is performed) is preferably 15% by mass or less, more preferably 10% by mass or less, and yet more preferably 5% by mass or less in case an unintended object is generated due to excessive crosslinking during a wire coating step. On the other hand, the graft amount is preferably 0.1% by mass or more, more preferably 1% by mass or more, and yet more preferably 2.5% by mass or more from the viewpoint of crosslinking degree (gel content) of the wire coat.

The silane coupling agent is grafted onto the polyolefin generally in a manner such that a free-radical generating agent is added to the polyolefin and the silane coupling agent to mix them all with the use of a twin-screw extruder to prepare a batch for silane-grafting. It is also preferable that the silane coupling agent is grafted onto the polyolefin in a manner such that the silane coupling agent is added when grafting the silane coupling agent onto the polyolefin.

Examples of the free-radical generating agent include an organic peroxide such as dicumyl peroxide (DCP), benzoyl peroxide, dichlorobenzoyl peroxide, di-tent-butyl peroxide, butyl peracetate, tert-butyl perbenzoate, and 2,5-dimethyl-2, 5-di (tert-butyl peroxy) hexane. Among them, the dicumyl peroxide (DCP) is preferably used. For example, it is preferable that when the dicumyl peroxide (DCP) is used as the free-radical generating agent, the batch for silane-grafting is adjusted to be 200 degrees C. or more in order to graft-polymerize the silane coupling agent onto the polyolefin.

The content of the free-radical generating agent is preferably in the range of 0.025 to 0.1 parts by mass with respect to 100 parts by mass of the polyolefin to be silane-modified. If the content is less than 0.025 parts by mass, a grafting reaction of the silane coupling agent does not proceed sufficiently, which makes it difficult for the composition to obtain a desired gel content. On the other hand, if the content is more than 0.1 parts by mass, the ratio of breaking the molecules of the polyolefin rises, so that crosslinking of the peroxide unintentionally proceeds. In such a case, a crosslinking reaction of the polyolefin proceeds excessively, and asperities are liable to appear on a product surface when the free-radical generating agent is mixed with the flame-retardant batch. To be specific, when the wire coating member is formed, asperities appear on a surface of the wire coating member, and the wire coating member is liable to have marred surface appearance. In addition, melt viscosity of the composition becomes too high and an excessive load is applied on an extruder, which results in decreased workability.

(B) The unmodified polyolefin defines polyolefin that is not modified by a silane coupling agent or a functional group. Specific examples of the unmodified polyolefin include the polyolefin of (A), which is described above, and thus a detailed description thereof is omitted. Polyethylene such as VLDPE and LDPB is preferably used for (B) the unmodified polyolefin because the polyethylene can provide a wire with flexibility, and the filler that defines the flame retardant can disperse well.

Specific examples of the polyolefin that is used for (C) the modified polyolefin that is modified by the functional group include the polyolefin of (A), which is described above, and thus a detailed description thereof is omitted. A resin of a same group as the resin used for the unmodified polyolefin is preferably used for (C) the modified polyolefin from the viewpoint of compatibility. In addition, polyethylene such as VLDPE and LDPE is preferably used for (C) the modified polyolefin because the polyethylene can provide a wire with flexibility, and the filler that defines the flame retardant can disperse well.

Examples of the functional group include a carboxylic acid group, an acid anhydrous group, an amino group, an epoxy group, a silane group, and a hydroxyl group. Among them, the carboxylic acid group, the acid anhydrous group, the amino group, and the epoxy group are preferably used because these functional groups have a favorable adhesion property to the filler that defines the flame retardant.

The modified polyolefin may contain a one or a plurality of these functional groups. In addition, a one or a plurality of modified polyolefins may be used, which are selected from modified polyolefins of a same kind that are modified by different functional groups, modified polyolefins of different kinds that are modified by different functional groups, and modified polyolefins of different kinds that are modified by functional groups of a same kind.

The content of the functional group in the modified polyolefin is preferably in the range of 0.5 to 10 parts by mass with respect to 100 parts by mass of the polyolefin. If the content of the functional group is more than 10 parts by mass, a property of stripping a coat at the time of processing ends of a wire could be degraded. On the other hand, if the content of the functional group is less than 0.5 parts by mass, the effect of modification by the functional group is insufficient.

The polyolefin is modified by the functional group in a method of graft-polymerizing a compound containing the functional group onto the polyolefin, or in a method of copolymerizing a compound containing the functional group and an olefin monomer to obtain an olefin copolymer.

Examples of the compound for introducing the carboxylic acid group and/or the acid anhydrous group that defines the functional group include an alpha, beta-unsaturated dicarboxylic acid such as a maleic acid, a fumaric acid, a citraconic acid and an itaconic acid, anhydrides thereof, and an unsaturated monocarboxylic acid such as an acrylic acid, a methacrylic acid, a fran acid, a crotonic acid, a vinylacetic acid and a pentane acid.

Examples of the compound for introducing the amino group that defines the functional group include aminoethyl (meth)acrylate, propylaminoethyl(meth)acrylate, dimethyl aminoethyl(meth)acrylate, diethyl aminoethyl(meth)acrylate, dibutyl aminoethyl(meth)acrylate, aminopropyl(meth)acrylate, phenylaminoethyl(meth)acrylate, and cyclohexylaminoethyl(meth)acrylate.

Examples of the compound for introducing the epoxy group that defines the functional group include glycidyl acrylate, glycidyl methacrylate, an itaconic monoglycidyl ester, a butene tricarboxylic acid monoglycidyl ester, a butene tricarboxylic acid diglycidyl ester, a butene tricarboxylic acid triglycidyl ester, glycidyl esters such as an alpha-chloroacrylic acid, a maleic acid, a crotonic acid and a fumaric acid, glycidyl ethers such as a vinyl glycidyl ether, an allyl glycidyl ether, a glycidyl oxyethyl vinyl ether and a styrene-p-glycidyl ether, and p-glycidyl styrene.

Examples of (D1) the bromine flame retardant include ethylenebis (pentabromobenzene)[also known as bis (pentabromophenyl)ethane], tetrabromobisphenolA(TBBA), hexabromocyclododecane (HBCD), bis(tetrabromophthalimide)ethane, TBBA-carbonate oligomer, TBBA-epoxyoligomer, brominated polystyrene, TBBA-bis(dibromopropylether), poly(dibromopropylether), and hexabromobenzene. Having favorable flame retardancy, the bromine flame retardant that has a relatively high melting point is preferably used. To be specific, the bromine flame retardant that has a melting point of 200 degrees C. or more is preferably used. Examples of the bromine flame retardant that has a melting point of 200 degrees C. or more include ethylenebis (pentabromobenzene), bis(tetrabromophthalimide)ethane, and TBBA-bis(dibromopropylether).

It is to be noted that a flame retardant made of a decabromo compound such as decabromo diphenyl ether (DecaBDE) has a profound flame-retardant effect; however, corresponding to Class I Designated Chemical Substances set forth in Article 4 of the Act on Confirmation, etc. of Release Amounts of Specific Chemical Substances in the Environment and Promotion of Improvements to the Management Thereof, the flame retardant has a disadvantage against other bromine flame retardants from the viewpoint of the environment, and thus cannot be used in the present invention.

It is essential only that (D) the flame retardant should contain at least (D1) the bromine flame retardant. It is also preferable that (D) the flame retardant further contains (D2) antimony trioxide that defines a flame-retardant auxiliary agent. It is expected that use of (D2) the antimony trioxide together with the bromine flame retardant generates a synergistic effect. It is preferable to use antimony trioxide having a purity of 99% or more. The antimony trioxide is prepared by pulverizing and microparticulating antimony trioxide that is produced as a mineral. The microparticulated antimony trioxide has an average particle size of preferably 3 μm or less, and more preferably 1 μm or less. If the average particle size of the antimony trioxide is larger, the interface strength between the antimony trioxide and the resin could be decreased. In addition, the antimony trioxide may be subjected to a surface treatment in order to adjust the particle size or improve the interface strength between the antimony trioxide and the resin. Examples of the surface treatment agent include a silane coupling agent, a higher fatty acid and a polyolefin wax.

(E) The cross-linking catalyst defines a silanol condensation catalyst for silane crosslinking the silane-grafted polyolefin. Examples of the cross-linking catalyst include a metal carboxylate containing a metal such as tin, zinc, iron, lead and cabalt, a titanate ester, an organic base, an inorganic acid, and an organic acid.

Specific examples of (E) the cross-linking catalyst include dibutyltin dilaurate, dibutyltin dimalate, dibutyltin mercaptide (e.g., dibutyltin bis-octylthioglycolate, a dibutyltin beta-mercaptopropionate polymer), dibutyltin diacetate, dioctyltin dilaurate, stannous acetate, stannous caprylate, lead naphthenate, cobalt naphthenate, barium stearate, calcium stearate, tetrabutyl titanate, tetranonyl titanate, dibutylamine, hexylamine, pyridine, a sulfuric acid, a hydrochloric acid, a toluenesulfonic acid, an acetate, a stearic acid, and a maleic acid. Among them, the dibutyltin dilaurate, the dibutyltin dimalate, and the dibutyltin mercaptide are preferably used.

In addition, the content of (E) the cross-linking catalyst is preferably in the range of 0.5 to 5 parts by mass, and more preferably in the range of 1 to 5 parts by mass with respect to 100 parts by mass of (A) the silane-grafted polyolefin that defines the resin component of the batch for silane-grafting. The content of 0.5 parts by mass or more allows the composition to obtain an appropriate crosslinking degree, which eliminates the possibility of having an insufficient effect of improving heat resistance. In addition, the content of 10 parts by mass or less eliminates the possibility of having marred surface appearance.

Examples of (F) the phenolic antioxidant include a monophenolic antioxidant, a bis phenolic antioxidant and a polymer phenolic antioxidant. Among them, the polymer phenolic antioxidant is preferably used. Specific examples of the polymer phenolic antioxidant (hindered phenolic antioxidant) include pentaerythritol tetrakis [3-(3,5-di-tert-butyl-4-hydroxyphenyl) propionate]. The content of (F) the phenolic antioxidant is preferably in the range of 0.5 to 5 parts by mass with respect to 100 parts by mass of the total content of the (A), (B) and (C) components.

(G) The either one of (G1) the zinc sulfide, and (G2) the zinc oxide and (G3) the imidazole compound improves heat resistance of the coat. ISO 6722 is an international standard used for a wire for automobile. A wire for automobile is classified under A to E classes in accordance with ISO 6722 depending on its allowable temperature limit. When used for the wire for automobile, to be specific, when used for a cable for battery where a high voltage is placed, the insulated wire is sometimes required to have properties of C class, at which the insulated wire should have an allowable temperature limit of 125 degrees C., or D class at which the insulated wire should have an allowable temperature limit class of 150 degrees C. The addition of (G) the either one of (G1) the zinc sulfide, and (G2) the zinc oxide and (G3) the imidazole compound is efficient in a case where high heat resistance is required as described above. In either of the cases of addition of (G1) the zinc sulfide only, and the addition of (G2) the zinc oxide and (G3) the imidazole compound only, a similar effect of heat resistance can be produced.

The zinc oxide is produced in a method of oxidizing zinc vapors, which exude from a zinc mineral by adding a reducing agent such as coke thereto and firing the zinc mineral, by air, or in a method of producing from a zinc sulfide or a zinc chloride. The production method of the zinc oxide is not limited specifically. The zinc oxide may be produced in either method. The zinc sulfide may be produced in a known production method. The zinc oxide or the zinc sulfide has an average particle size of preferably 3 μm or less, and more preferably 1 μm or less. If the average particle size of the zinc oxide or the zinc sulfide is smaller, the interface strength between the zinc oxide or the zinc sulfide and the resin is improved, which improves dispersibility.

A benzimidazole compound containing sulfur is preferably us ed as (G3) the imidazole compound. Specific examples of the benzimidazole compound include 2-mercaptobenzimidazole, 2-mercaptomethylbenzimidazole, 4-mercaptomethylbenzimidazole, 5-mercaptomethylbenz imidazole, and zinc salt thereof. Among them, the 2-mercaptobenzimidazole and the zinc salt thereof are preferably used. The benzimidazole compound may have a substituent such as an alkyl group at other positions of benzimidazole skeletons.

The content of (G1) the zinc sulfide, and the content of (G2) the zinc oxide and (G3) the imidazole compound are preferably in the following ranges with respect to 100 parts by mass of the total content of the (A), (B) and (C) resin components. If the content is smaller, there arises a possibility of having an insufficient effect of improving heat resistance. On the other hand, if the content is too large, the particles are liable to coagulate, and the wire is liable to have marred surface appearance, and a mechanical property such as wear resistance could be degraded.

(G1) The zinc sulfide: 1 to 20 parts by mass, preferably 3 to 10 parts by mass

The total content of (G2) the zinc oxide +(G3) the imidazole compound: 1 to 20 parts by mass, preferably 3 to 10 parts by mass An amine copper inhibitor such as 3-(n-salicyloyl) amino-1, 2, 4-triazole is used for (H) the copper inhibitor. The addition of (H) the copper inhibitor to the composition further produces an effect of improving heat resistance. The content of the copper inhibitor is in the range of 0.1 to 3 parts by mass with respect to 100 parts by mass of the total content of the (A), (B) and (C) resin components.

It is preferable that the composition for the wire coating member further contains one kind or more than one kind of additive that is used for a general wire coating material other than the materials described above within a range of not impairing the properties of the wire. Examples of the additive include a lubricant such as a stearic acid, an ultraviolet absorber, a processing aid (e.g., wax, lubricant), a flame-retardant auxiliary agent and a coloring agent.

If an inorganic filler such as magnesium hydroxide, magnesium oxide and calcium carbonate is added as the additive, the hardness of the resin can be adjusted, whereby workability and high heat deformation resistance of the coat can be improved. The content of the inorganic filler is 30 parts by mass or less, and preferably 10 parts by mass or less with respect to 100 parts by mass of the total content of the (A), (B) and (C) resin components within a range of not impairing the strength of the resin. Natural magnesium hydroxide of natural mineral origin that is prepared by pulverizing a mineral predominantly composed of magnesium hydroxide, or synthesized magnesium hydroxide that is synthesized from a Mg source contained in seawater is used as the magnesium hydroxide.

In addition, the content of the lubricant such as the stearic acid is preferably 5 parts by mass or less, and preferably 3 parts by mass or less with respect to 100 parts by mass of the total content of the (A), (B) and (C) resin components. The addition of the lubricant has an effect of improving surface appearance of a wire; however, the addition of a large amount of the lubricant could adversely affect workability of a wire and workability of a wiring harness.

Hereinafter, a description of a method for producing an insulated wire from the composition for the wire coating member will be provided. It is essential only that the composition for the wire coating member that contains (A) the water-crosslinkable polyolefin, (B) the unmodified polyolefin, (C) the modified polyolefin, (D) the flame retardant, (D1) the bromine flame retardant, (D2) the antimony trioxide, (E) the cross-linking catalyst, the either one of (G1) the zinc sulfide, and (G2) the zinc oxide and (G3) the imidazole compound, (H) the copper inhibitor, and the other additives should be heat-kneaded, a conductor should be extrusion-coated with the heat-kneaded component, and a wire coating member that is extrusion-coated should be water-crosslinked.

The heat-kneading of the materials described above can be performed with the use of a generally used kneader such as a Banbury mixer, a pressure kneader, a kneading extruder, a twin-screw extruder and a roll.

It is also preferable that the composition for the wire coating member is prepared by mixing a batch containing the water-crosslinkable polyolefin and the flame-retardant batch that are prepared separately in advance. To be specific, the batch containing the water-crosslinkable polyolefin is prepared by heat-kneading only (A) the water-crosslinkable polyolefin, or by heat-kneading materials for (A) the water-crosslinkable polyolefin (i.e., the polyolefin, the silane coupling agent, and the free-radical generating agent), while the flame-retardant batch is prepared by heat-kneading (B) the unmodified polyolefin, (C) the modified polyolefin, and (D1) the bromine flame retardant and (D2) the antimony trioxide of (D) the flame retardant, except the cross-linking catalyst. The cross-linking catalyst is added to the batch containing the water-crosslinkable polyolefin and the flame-retardant batch, and they are heat-kneaded. Then, a conductor is extrusion-coated with the heat-kneaded component, and a wire coating member is formed around the conductor. Then, the wire coating member that is extrusion-coated is water-crosslinked. It is also preferable that the cross-linking catalyst is added to either one of the batch containing the water-crosslinkable polyolefin and the flame-retardant batch.

The above-described formation of the wire coating member by preparing the batch containing the water-crosslinkable polyolefin and the flame-retardant batch separately in advance, then kneading the batches, extrusion-coating the conductor with the heat-kneaded component can prevent asperities from appearing on a surface of the wire coating member, and thus allows the wire coating member to have favorable surface appearance with ease. In addition, melt viscosity of the composition does not become too high during the heat-kneading step and the extrusion-coating step, which can prevent an excessive load from being applied on an extruder. Thus, favorable workability can be achieved.

The batches that are formed into pellets can be dry-blended with the use of a mixer or an extruder in the heat-kneading step. The conductor is extrusion-coated with the wire coating member with the use of a general extrusion molding machine in the extrusion-coating step. The wire coating member formed in the extrusion-coating step can be cross linked by being exposed to vapor or water in the crosslinking step. The crosslinking step is preferably performed under the conditions at temperatures from an ambient temperature to 90 degrees C. for 48 hours or less, more preferably at temperatures from 60 to 80 degrees C. for 12 to 24 hours.

Next, a description of an insulated wire of a preferred embodiment of the present invention will be provided. The insulated wire includes a conductor that is made from copper, a copper alloy, aluminum or an aluminum copper alloy, and a wire coating member coated on the conductor, the member being prepared by water-crosslinking the composition for the wire coating member described above. The diameter, the material and other properties of the conductor are not specifically limited and may be determined depending on the intended use. In addition, the thickness of the insulated coating member is not specifically limited and may be determined considering the conductor diameter. The wire coating member may have a single-layered configuration, or may be have a multi-layered configuration.

The wire coating member after the water-crosslinking preferably has a crosslinking degree of 50% more, and more preferably 60% or more from the viewpoint of heat resistance. The crosslinking degree can be adjusted in accordance with the graft amount of the silane coupling agent of the contained silane-grafted polyolefin, the kind and amount of the cross-linking catalyst, or the conditions for silane crosslinking (water-crosslinking)(temperature and duration).

Next, a description of a wiring harness of a preferred embodiment of the present invention will be provided. The wiring harness includes the insulated wires described above. The wiring harness has a configuration such that a single wire bundle composed of the insulated wires described above only, or a mixed wire bundle composed of the insulated wires described above and other insulated wires is coated with a wiring harness protection member.

The number of the wires included in the single wire bundle or the mixed wire bundle is not limited specifically, and may be arbitrarily determined.

When using the mixed wire bundle, the structure of the other insulated wires is not limited specifically. The wire coating member may have a single-layered configuration, or may be have a multi-layered configuration. In addition, the kind of the insulated coating member is not limited specifically.

In addition, the wiring harness protection member is arranged to coat the outer surface of the wire bundle to protect the wire bundle inside from the external environment. Examples of the wiring harness protection member include a wiring harness protection member having a tape-shaped base member on at least one side of which an adhesive is applied, a wiring harness protection member having a tube-shaped base member, and a wiring harness protection member having a sheet-shaped base member. The wiring harness protection member is preferably chosen depending on the intended use.

Specific examples of the base member for the wiring harness protection member include non-halogenous flame-retardant resin compositions of various types, vinyl chloride resin compositions of various types, and halogenous resin compositions of various types other than the vinyl chloride resin compositions.

EXAMPLE

A description of the present invention will now be specifically provided with reference to Examples and Comparative Examples. However, the present invention is not limited thereto.

(Material Used, Manufacturer, and Other Information)

Materials used in the Examples and Comparative Examples are provided below along with their manufacturers and trade names.

[1] Silane-grafted PP [manuf.: MITSUBISHI CHEMICAL CORPORATION, trade name: LINKLON XPM800HM]

[2] Silane-grafted PE1 [manuf.: MITSUBISHI CHEMICAL CORPORATION, trade name: LINKLON XLE815N (LLDPE)]

[3] Silane-grafted PE2 [manuf.: MITSUBISHI CHEMICAL CORPORATION, trade name: "LINKLON XCF710N" (LDPE)]

[4] Silane-grafted PE3 [manuf.: MITSUBISHI CHEMICAL CORPORATION, trade name: "LINKLON QS241HZ" (HDPE)]

[5] Silane-grafted PE4 [manuf.: MITSUBISHI CHEMICAL CORPORATION, trade name: "LINKLON SH700N" (VLDPE)]

[6] Silane-grafted EVA [manuf.: MITSUBISHI CHEMICAL CORPORATION, trade name: "LINKLON XVF600N"]

[7] PP elastomer [manuf.: JAPAN POLYPROPYLENE CORPORATION, trade name: "NEWCON NAR6"]

[8] PE 1: VLDPE [manuf.: DUPONT DOW ELASTOMERS JAPAN KK, trade name: "ENGAGE 8003"]

[9] PE 2: LDPE [manuf.: NIPPON UNICAR COMPANY LIMITED, trade name: "NUC8122"]

[10] PE3: LLDPE [manuf.: PRIME POLYMER CO. , LTD, trade name: "ULTZEX10100W"]

[11] Maleic acid denatured PE [manuf.: NOF CORPORATION, trade name: "MODIC AP512P"]

[12] Epoxy denatured PE [manuf.: SUMITOMO CHEMICAL CO., LTD., trade name: "BONDFAST E (E-GMA)"]

[13] Maleic acid denatured PP [manuf.: MITSUBISHI CHEMICAL CORPORATION, trade name: "ADMER QB550"]

[14] Bromine flame retardant 1: ethylenebis (pentabromobenzene) [manuf.: ALBEMARLE JAPAN CORPORATION, trade name: "SAYTEX8010"]

[15] Bromine flame retardant 2: TBBA-bis(dibromopropylether) [manuf.: SUZUHIRO CHEMICAL CO., LTD., trade name: "FCP-680"]

[16] Bromine flame retardant 3: tetrabromobisphenolA, [manuf.: ALBEMARLE JAPAN CORPORATION, trade name: "SAYTEXCP2000"]

[17] Antimonytrioxide: [manuf.: YAMANAKA&CO., LTD., trade name: "ANTIMONY TRIOXIDE MSW GRADE"]

[18]Magnesium hydroxide[manuf.: KYOWACHEMICAL INDUSTRY CO., LTD., trade name: "KISUMA 5"]

[19] Calcium carbonate [manuf.: SHIRAISHI CALCIUM KAISHA, LTD., trade name: "VIGOT15"]

[20] Antioxidant 1 [Manuf.: CIBA SPECIALTY CHEMICALS INC., trade name: "IRGANOX 1010"]

[21] Antioxidant 2 [Manuf.: CIBA SPECIALTY CHEMICALS INC., trade name: "IRGANOX 1330"]

[22]Copper inhibitor [Manuf.: ADEKA CORPORATION, trade name: CDA-1]

Zinc oxide [Manuf.: HAKUSUITECH CO., LTD., trade name: "ZINC OXIDE JIS2"]

[24] Zinc sulfide [Manuf.: SACHTLEBEN CHEMIE GMBH, trade name: "SACHTOLITH HD-S"]

[25] Additive: benzimidazole compound [Manuf.: KAWAGUCHI CHEMICAL INDUSTRY CO,. LTD., trade name: "ANTAGE MB"]

[26] Lubricant 1: erucic acid amide [Manuf.: NOF CORPORATION, trade name: "ALFLOW P10"]

[27] Lubricant 2: stearic acid amide [Manuf.: NOF CORPORATION, trade name: "ALFLOW S10"]

[28] Crosslinking catalyst [manuf.: MITSUBISHI CHEMICAL CORPORATION, trade name: "LINKLON LZ0515H"]

(Preparation of Flame-retardant Batch)

Flame-retardant batches were prepared as follows: materials for flame-retardant batches were prepared at the ratios indicated in Columns A of the Examples and Comparative Examples of Tables 1 and 2 and put into a twin-screw kneading extruder. The materials for each flame-retardant batch were heat-kneaded at 200 degrees C. for 0.1 to 2 minutes, and then the kneaded component was formed into a pellet. Thus, the flame-retardant batches consistent with Examples and Comparative Examples were prepared.

(Preparation of Insulated Wire)

The flame-retardant batches containing the materials at the ratios indicated in Columns A, and silane-grafted polyolefins and crosslinking catalysts (no silane-grafted polyolefin was added for Comparative Example 1) were prepared at the ratios indicated in Columns B of the Examples and Comparative Examples of Tables 1 and 2, and were kneaded by using a hopper of an extruder at about 180 to 200 degrees C., and subjected to extrusion processing. Conductors having an external diameter of 2.4 mm were extrusion-coated with thus-prepared compositions, and insulators having a thickness of 0.7 mm were formed (i.e., the external diameter of the insulated wires after the extrusion-coating was 3.8 mm). Then, each composition was water-crosslinked in a bath at a high humidity of 95% and at a high temperature of 60 degrees C. for 24 hours. Thus, insulated wires consistent with Examples and Comparative Examples were prepared. Evaluations of the obtained insulated wires were made in terms of the following properties.

[Gel Content]

Gel contents of the insulated wires were measured in accordance with the JASO-D608-92. To be specific, about 0.1 g of test samples of the insulators of the insulated wires were each weighed out and put in test tubes. 20 ml xylene was added to each sample, and then, each sample was heated in a constant temperature oil bath at 120 degrees C. for 24 hours. Then, each sample was taken out from the test tube to be dried in a dryer at 100 degrees C. for 6 hours. Each sample was cooled to a room temperature and precisely weighed. The percentages of the masses of the test samples after the test to the masses of the test samples before the test were defined as the gel contents. The test samples having a gel content of 50% or more were regarded as good, and the test sample having a gel content of less than 50% was regarded as bad. The gel content is a generally used index of a water crosslinking state of a crosslinked wire.

[Productivity]

The speed of each insulated wire was increased and decreased when each insulated wire was being extruded, and the insulated wires that could have a designed external diameter even at the speed of 50 m/min or more were regarded as good, the insulated wires that were 300% or more was regarded as excellent, and the insulated wire that could not have a designed external diameter at the speed of 50 m/min or more was regarded as bad.

[Flame Retardancy]

A flame retardancy test of each insulated wire was performed in accordance with the ISO 6722. The insulated wires that were extinguished within 70 seconds were regarded as good, and the insulated wires that were extinguished over 70 seconds were regarded as bad.

[Wire Surface Roughness]

Wire surface roughness is used to evaluate surface appearance of an insulated wire. The measurement of average surface roughness (Ra) of each insulated wire was obtained with the use of a needle detector. The insulated wires of which Ra was less than 1 μm were regarded as good, the insulated wires of which Ra was less than 0.5 μm were regarded as excellent, and the insulated wire of which Ra was more than 1 μm was regarded as bad. The measurement of the wire surface roughness was performed with the use of "SURFTEST SJ301" manufactured by MITUTOYO CORPORATION.

[Tensile Elongation]

The measurement of tensile elongation of each insulated wire was obtained by a tensile test in accordance with the JIS C3005. To be specific, the insulated wires were, after the conductors were removed therefrom, each cut to a length of 100 mm, and tubular test pieces including only the wire coating members were obtained. Then, at a room temperature of 23±5 degrees C., both the ends of each test piece were attached to chucks of a tensile tester and were pulled at a tensile speed of 200 mm/min, and the load and elongation at the time of break of each test piece were measured. The insulated wires having a tensile elongation of 125% or more were regarded as good, the insulated wires having a tensile elongation of 300% or more were regarded as excellent, and the insulated wire having a tensile elongation less than 125% was regarded as bad.

[ISO Long-time Heating Test]

An aging test of each insulated wire was performed in accordance with the ISO 6722 at 150 degrees C. for 3000 hours, and then a withstand voltage test of 1 kv for 1 minute was performed on each insulated wire. The insulated wires that stood the withstand voltage test of 1 kv for 1 minute after the aging test of 3000 hours were regarded as passed and graded good, and the insulated wires that could not stand the withstand voltage test of 1 kv for 1 minute after the aging test of 3000 hours were regarded as failed and graded bad.

[JASO Long-time Heating Test]

An aging test of each insulated wire was performed in accordance with the JASO-D609 at 150 degrees C. for 10000 hours, and then the measurement of tensile elongation of each insulated wire was obtained under the same conditions as the tensile test described above. The insulated wires having a tensile elongation of 100% or more were regarded as passed and graded good, and the insulated wires having a tensile elongation less than 100% were regarded as failed and graded bad.

[Wear Resistance]

A wear resistance test of each insulated wire was performed in accordance with the ISO 6722. The insulated wires that could resist blade reciprocation of 500 times or more were regarded as good, and the insulated wire that could not resist the blade reciprocation of 500 times or more was regarded as bad.

TABLE 1

|  | No. | Name of Material | Example 1 A | Example 1 B | Example 2 A | Example 2 B | Example 3 A | Example 3 B | Example 4 A | Example 4 B | Example 5 A | Example 5 B | Example 6 A | Example 6 B |
|---|---|---|---|---|---|---|---|---|---|---|---|---|---|---|
| Material of composition (parts by mass) | 1 | Silane-grafted PP | — | 30 | — | — | — | — | — | — | — | — | — | — |
|  | 2 | Silane-grafted PE 1 | — | — | — | 60 | — | — | — | — | — | — | — | — |
|  | 3 | Silane-grafted PE 2 | — | — | — | — | — | 90 | — | — | — | — | — | — |
|  | 4 | Silane-grafted PE 3 | — | — | — | — | — | — | — | 60 | — | — | — | — |
|  | 5 | Silane-grafted PE 4 | — | — | — | — | — | — | — | — | — | 60 | — | — |
|  | 6 | Silane-grafted EVA | — | — | — | — | — | — | — | — | — | — | — | 60 |
|  | 7 | PP elastomer | 10 | — | — | — | — | — | 5 | — | — | — | — | — |

TABLE 1-continued

| | No. | Name of Material | Example 1 A | Example 1 B | Example 2 A | Example 2 B | Example 3 A | Example 3 B | Example 4 A | Example 4 B | Example 5 A | Example 5 B | Example 6 A | Example 6 B |
|---|---|---|---|---|---|---|---|---|---|---|---|---|---|---|
| | 8 | PE 1 | 50 | — | — | — | — | — | 30 | — | 5 | — | — | — |
| | 9 | PE 2 | — | — | 30 | — | — | — | — | — | 30 | — | — | — |
| | 10 | PE 3 | — | — | — | — | 5 | — | — | — | — | — | 35 | — |
| | 11 | Maleic acid denatured PE | — | — | 10 | — | — | — | 5 | — | 5 | — | — | — |
| | 12 | Epoxy denatured PE | 10 | — | — | — | — | — | — | — | — | — | — | — |
| | 13 | Maleic acid denatured PP | — | — | — | — | 5 | — | — | — | — | — | 5 | — |
| | 14 | Bromine flame retardant 1 | — | — | — | — | 20 | — | — | — | 20 | — | 10 | — |
| | 15 | Bromine flame retardant 2 | — | — | 8 | — | — | — | 70 | — | — | — | — | — |
| | 16 | Bromine flame retardant 3 | 100 | — | — | — | — | — | — | — | — | — | — | — |
| | 17 | Antimony trioxide | — | — | 2 | — | 10 | — | — | — | 10 | — | 70 | — |
| | 18 | Magnesium hydroxide | — | — | 30 | — | — | — | — | — | — | — | 50 | — |
| | 19 | Calcium carbonate | — | — | — | — | — | — | — | — | 10 | — | — | — |
| | 20 | Antioxidant 1 | 1.5 | — | 1.5 | — | 1.5 | — | 1.5 | — | 1.5 | — | 1.5 | — |
| | 21 | Antioxidant 2 | 1.5 | — | 1.5 | — | 1.5 | — | 1.5 | — | 1.5 | — | 1.5 | — |
| | 22 | Copper inhibitor | 1 | — | 1 | — | 1 | — | 1 | — | 1 | — | 1 | — |
| | 23 | Zinc oxide | 5 | — | — | — | 7 | — | — | — | — | — | — | — |
| | 24 | Zinc sulfide | — | — | 10 | — | — | — | 5 | — | 10 | — | 10 | — |
| | 25 | Additive | 5 | — | — | — | 7 | — | — | — | — | — | — | — |
| | 26 | Lubricant 1 | — | — | — | — | — | — | 1 | — | — | — | 1 | — |
| | 27 | Lubricant 2 | — | — | — | — | — | — | — | — | 1 | — | — | — |
| | 28 | Crosslinking catalyst | — | 5 | — | 5 | — | 5 | — | 5 | — | 5 | — | 5 |
| | Subtotal | | 184 | 35 | 94 | 65 | 58 | 95 | 120 | 65 | 95 | 65 | 185 | 65 |
| | Total | | 219 | | 159 | | 153 | | 185 | | 160 | | 250 | |
| Test result | Gel content | | Good | | Good | | Good | | Good | | Good | | Good | |
| | Productivity | | Good | | Excellent | | Excellent | | Good | | Excellent | | Good | |
| | Flame retardancy | | Good | | Good | | Good | | Good | | Good | | Good | |
| | Wire surface roughness | | Good | | Good | | Excellent | | Excellent | | Excellent | | Good | |
| | Tensile elongation | | Good | | Good | | Excellent | | Good | | Excellent | | Good | |
| | ISO long-time heating test | | Good | | Good | | Good | | Good | | Good | | Good | |
| | JASO long-time heating test | | Good | | Good | | Good | | Good | | Good | | Good | |
| | Wear resistance | | Good | | Good | | Good | | Good | | Good | | Good | |

TABLE 2

| | No. | Name of Material | Comparative Example 1 A | Comparative Example 1 B | Comparative Example 1 A | Comparative Example 1 B | Comparative Example 1 A | Comparative Example 1 B | Comparative Example 1 A | Comparative Example 1 B | Comparative Example 1 A | Comparative Example 1 B | Comparative Example 1 A | Comparative Example 1 B |
|---|---|---|---|---|---|---|---|---|---|---|---|---|---|---|
| Material of composition (parts by mass) | 1 | Silane-grafted PP | — | 30 | — | — | — | — | — | — | — | — | — | — |
| | 2 | Silane-grafted PE 1 | — | — | — | 60 | — | — | — | — | — | — | — | — |
| | 3 | Silane-grafted PE 2 | — | — | — | — | — | 90 | — | — | — | — | — | — |
| | 4 | Silane-grafted PE 3 | — | — | — | — | — | — | — | — | — | — | — | — |
| | 5 | Silane-grafted PE 4 | — | — | — | — | — | — | — | — | — | 60 | — | — |
| | 6 | Silane-grafted EVA | — | — | — | — | — | — | — | — | — | — | — | 100 |
| | 7 | PP elastomer | 10 | — | — | — | 10 | — | 5 | — | — | — | — | — |
| | 8 | PE 1 | 50 | — | — | — | — | — | 30 | — | 5 | — | — | — |
| | 9 | PE 2 | — | — | 30 | — | — | — | 60 | — | 30 | — | — | — |
| | 10 | PE 3 | — | — | — | — | — | — | — | — | — | — | — | — |
| | 11 | Maleic acid denatured PE | — | — | 10 | — | — | — | 5 | — | 5 | — | — | — |
| | 12 | Epoxy denatured PE | 10 | — | — | — | — | — | — | — | — | — | — | — |
| | 13 | Maleic acid denatured PP | — | — | — | — | — | — | — | — | — | — | — | — |
| | 14 | Bromine flame retardant 1 | — | — | — | — | 20 | — | — | — | 20 | — | — | — |
| | 15 | Bromine flame retardant 2 | — | — | 8 | — | — | — | 70 | — | — | — | — | — |
| | 16 | Bromine flame retardant 3 | — | — | — | — | — | — | — | — | — | — | — | — |
| | 17 | Antimony trioxide | — | — | 2 | — | 10 | — | — | — | 10 | — | — | — |
| | 18 | Magnesium hydroxide | — | — | 30 | — | — | — | — | — | — | — | — | — |
| | 19 | Calcium carbonate | — | — | — | — | — | — | — | — | 10 | — | — | — |
| | 20 | Antioxidant 1 | 1.5 | — | 1.5 | — | 1.5 | — | 1.5 | — | — | — | 1.5 | — |
| | 21 | Antioxidant 2 | 1.5 | — | 1.5 | — | 1.5 | — | 1.5 | — | — | — | 1.5 | — |
| | 22 | Copper inhibitor | 1 | — | 1 | — | 1 | — | 1 | — | — | — | 1 | — |
| | 23 | Zinc oxide | 5 | — | — | — | 7 | — | — | — | — | — | — | — |
| | 24 | Zinc sulfide | — | — | — | — | — | — | 5 | — | — | — | 10 | — |
| | 25 | Additive | 5 | — | — | — | 7 | — | — | — | — | — | — | — |

TABLE 2-continued

|  | No. | Name of Material | Comparative Example 1 | | Comparative Example 1 | | Comparative Example 1 | | Comparative Example 1 | | Comparative Example 1 | | Comparative Example 1 | |
|---|---|---|---|---|---|---|---|---|---|---|---|---|---|---|
|  |  |  | A | B | A | B | A | B | A | B | A | B | A | B |
|  | 26 | Lubricant 1 | — | — | — | — | — | — | 1 | — | — | — | 1 | — |
|  | 27 | Lubricant 2 | — | — | — | — | — | — | — | — | 1 | — | — | — |
|  | 28 | Crosslinking catalyst | — | 5 | — | 5 | — | — | — | 5 | — | 5 | — | 5 |
|  | Subtotal | | 84 | 35 | 84 | 65 | 58 | 90 | 180 | 5 | 81 | 65 | 15 | 105 |
| Test result | Total | | 119 | | 149 | | 148 | | 185 | | 146 | | 120 | |
|  | Gel content | | Good | | Good | | Bad | | Bad | | Good | | Good | |
|  | Productivity | | Good | | Excellent | | Good | | Good | | Excellent | | Bad | |
|  | Flame retardancy | | Bad | | Good | | Good | | Good | | Good | | Bad | |
|  | Wire surface roughness | | Good | | Good | | Bad | | Excellent | | Excellent | | Good | |
|  | Tensile elongation | | Good | | Good | | Good | | Good | | Excellent | | Good | |
|  | ISO long-time heating test | | Good | | Bad | | Bad | | Bad | | Bad | | Good | |
|  | JASO long-time heating test | | Good | | Bad | | Bad | | Bad | | Bad | | Good | |
|  | Wear resistance | | Good | | Good | | Bad | | Good | | Good | | Bad | |

As is evident from Tables 1 and 2, the insulated wire of Comparative Example 1 does not contain a bromine flame retardant while the insulated wire of Example 1 contains. For this reason, the insulated wire of Comparative Example 1 is inferior in flame retardancy.

The insulated wire of Comparative Example 2 does not contain a zinc sulfide while the insulated wire of Example 2 contains. For this reason, the insulated wire of Comparative Example 2 is inferior in heat resistance, and failed accordingly both in the ISO long-time heating test and the JASO long-time heating test.

The insulated wire of Comparative Example 3 does not contain a crosslinking catalyst while the insulated wire of Example 3 contains. For this reason, having a low gel content, the insulated wire of Comparative Example 3 is regarded as bad in wire surface roughness and wear resistance, and failed in the ISO long-time heating test, and the JASO long-time heating test.

The insulated wire of Comparative Example 4 contains unmodified polyolefin instead of silane-grafted polyolefin while the insulated wire of Example 4 contains silane-grafted polyolefin. That is, the insulated wire of Comparative Example 4 does not contain water-crosslinkable polyolefin. For this reason, not crosslinked, the insulated wire of Comparative Example 4 is regarded as bad in gel content, and failed in the ISO long-time heating test, and the JASO long-time heating test.

The insulated wire of Comparative Example 5 does not contain an antioxidant, a copper inhibitor, or a zinc sulfide while the insulated wire of Example 5 contains. For this reason, the insulated wire of Comparative Example 5 is failed in the ISO long-time heating test, and the JASO long-time heating test.

The insulated wire of Comparative Example 6 does not contain a flame retardant or unmodified polyolefin. For this reason, the insulated wire of Comparative Example 6 is inferior in flame retardancy and productivity.

Meanwhile, the insulated wires of Examples 1 to 6 are all favorable in the properties, and excellent in productivity and heat resistance.

The foregoing description of the preferred embodiments of the present invention has been presented for purposes of illustration and description; however, it is not intended to be exhaustive or to limit the present invention to the precise form disclosed, and modifications and variations are possible as long as they do not deviate from the principles of the present invention.

The invention claimed is:

1. A composition for a wire coating member, the composition comprising:
   (A) water-crosslinkable polyolefin that comprises polyolefin that is modified by a silane coupling agent;
   (B) unmodified polyolefin;
   (C) modified polyolefin that is modified by a functional group;
   (D) a flame retardant;
   (E) a cross-linking catalyst;
   (F) a phenolic antioxidant; and
   (G) either one of (G1) a zinc sulfide, or (G2) a zinc oxide and (G3) an imidazole compound, wherein
       (D) the flame retardant contains (D1) a bromine flame retardant, and
       the composition does not include any additional inorganic fillers.

2. The composition according to claim 1,
   wherein (D) the flame retardant further contains (D2) antimony trioxide.

3. An insulated wire that comprises a wire coating member that comprises the composition for the wire coating member according to claim 2, the composition being water-crosslinked.

4. The composition according to claim 1,
   further containing (H) a copper inhibitor.

5. An insulated wire that comprises a wire coating member that comprises the composition for the wire coating member according to claim 4, the composition being water-crosslinked.

6. The composition according to claim 1, wherein
   the content of (A) the water-crosslinkable polyolefin is 30 to 90 parts by mass,
   the total content of (B) the unmodified polyolefin and (C) the modified polyolefin that is modified by the functional group is 10 to 70 parts by mass, and
   the content of (D1) the bromine flame retardant is 10 to 70 parts by mass with respect to 100 parts by mass of the total content of the (A), (B) and (C) components.

7. An insulated wire that comprises a wire coating member that comprises the composition for the wire coating member according to claim 6, the composition being water-crosslinked.

8. The composition according to claim 1, wherein (D1) the bromine flame retardant comprises a one or a plurality of bromine flame retardants selected from the group consisting of ethylenebis (pentabromobenzene), bis(tetrabromophthalimide)ethane, and tetrabromobisphenolA bis(dibromopropylether).

9. An insulated wire that comprises a wire coating member that comprises the composition for the wire coating member according to claim 8, the composition being water-crosslinked.

10. The composition according to claim 1, wherein the functional group, by which (C) the modified polyolefin is modified, comprises a one or a plurality of functional groups selected from the group consisting of a carboxylic acid group, an acid anhydride group, an amino group, and an epoxy group.

11. An insulated wire that comprises a wire coating member that comprises the composition for the wire coating member according to claim 10, the composition being water-crosslinked.

12. The composition according to claim 1, wherein the polyolefin of (A) the water-crosslinkable polyolefin comprises a one or a plurality of polyethylene selected from the group consisting of very low density polyethylene, linear low density polyethylene, and low density polyethylene.

13. An insulated wire that comprises a wire coating member that comprises the composition for the wire coating member according to claim 12, the composition being water-crosslinked.

14. An insulated wire that comprises a wire coating member that comprises the composition for the wire coating member according to claim 1, the composition being water-crosslinked.

15. The insulated wire according to claim 14, wherein the wire coating member comprises:
   a flame-retardant batch that contains at least (B) the unmodified polyolefin, (C) the modified polyolefin that is modified by the functional group, and (D1) the bromine flame retardant;
   (A) the water-crosslinkable polyolefin; and
   (E) the cross-linking catalyst,
   wherein the flame-retardant batch, the water-crosslinkable polyolefin, and the cross-linking catalyst are kneaded, a conductor of the wire is coated with the kneaded component that defines the wire coating member, and then the wire coating member is water-crosslinked.

16. A wiring harness including the insulated wire according to claim 15.

17. A wiring harness including the insulated wire according to claim 14.

* * * * *

UNITED STATES PATENT AND TRADEMARK OFFICE
CERTIFICATE OF CORRECTION

PATENT NO. : 9,093,197 B2
APPLICATION NO. : 13/520516
DATED : July 28, 2015
INVENTOR(S) : Tatsuya Shimada et al.

It is certified that error appears in the above-identified patent and that said Letters Patent is hereby corrected as shown below:

On the title page, item (73) Assignee, "AUMITOMO WIRING SYSTEMS, LTD." should be ---SUMITOMO WIRING SYSTEMS, LTD.---.

Signed and Sealed this
Twenty-ninth Day of September, 2015

Michelle K. Lee
*Director of the United States Patent and Trademark Office*